F. H. DUNN.
DISHWASHER.
APPLICATION FILED AUG. 10, 1921.
1,429,069.
Patented Sept. 12, 1922.
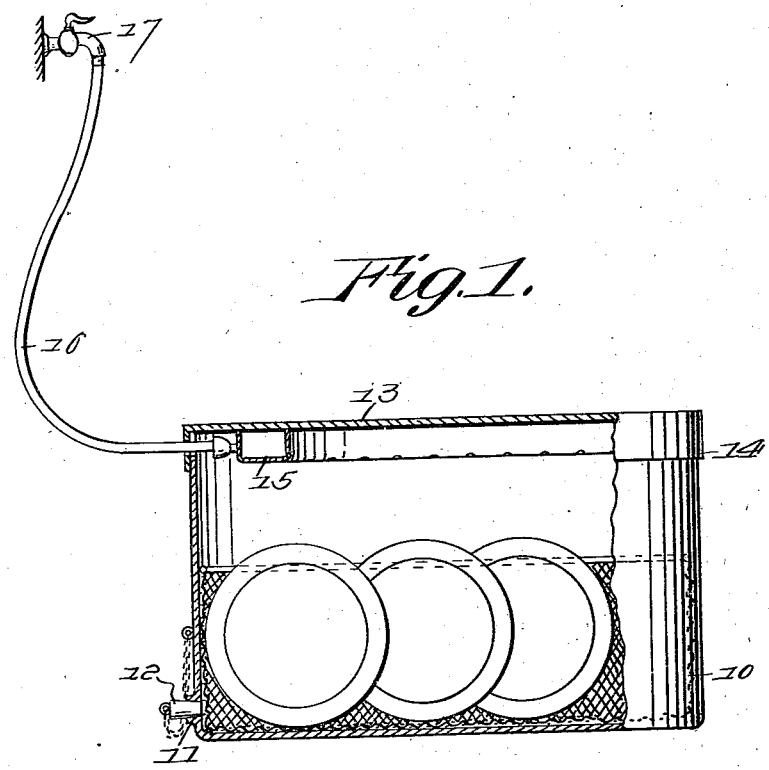
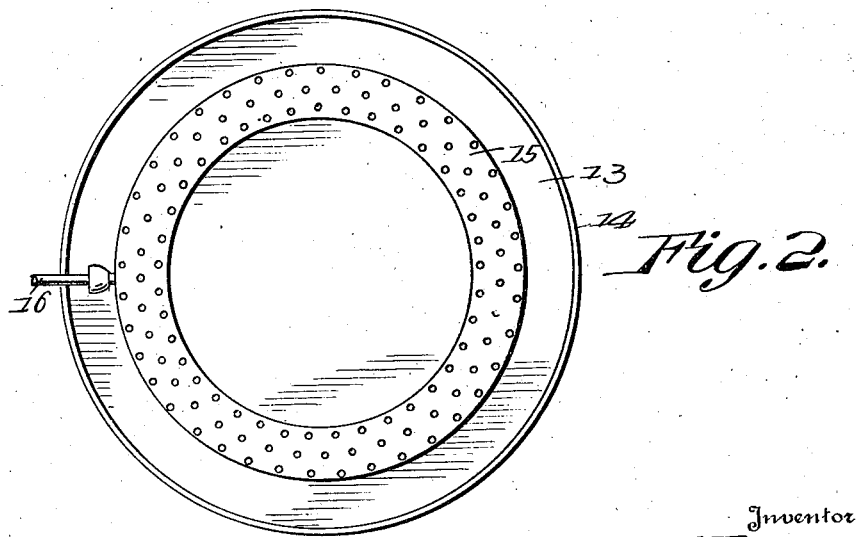
Inventor
Florence H. Dunn,
By G. Hume Talbert
Attorney Patented Sept. 12, 1922.

1,429,069

UNITED STATES PATENT OFFICE.

FLORENCE H. DUNN, OF KANSAS CITY, MISSOURI.

DISHWASHER.

Application filed August 10, 1921. Serial No. 491,274.

*To all whom it may concern:*

Be it known that FLORENCE H. DUNN, a citizen of the United States of America, residing at Kansas City, in the county of Jackson and State of Missouri, has invented new and useful Improvements in Dishwashers, of which the following is a specification.

The object of the invention is to provide a simple, inexpensive and efficient apparatus for dish washing and analogous operations designed as a means of cleansing dishes without handling, agitation or attrition other than that which is incident to the application thereto of water under pressure and applied under conditions conducive to the removal of accumulations of foreign matter thereon; and to provide a device for the purpose indicated which may also without intermediate handling of the dishes serve as a means of rinsing the same and of supporting them in position for drainage and subsequent drying; and with these objects in view the invention consists in a construction and combination of parts of which a preferred embodiment is shown in the accompanying drawings, wherein:

Figure 1 is a side view partly in section of a dish washing apparatus embodying the invention.

Figure 2 is an inverted view of the lid or cover.

The device consists of a receptacle 10 which is preferably of cylindrical form as being better adapted for the accommodation of dishes arranged in an upright or edgewise position and provided with an outlet 11 fitted with a stopper or plug 12 which may be removed to permit of the drainage of the liquid contents, together with a removable top or cover 13 flanged as at 14 to fit the upper edge of the wall of the receptacle and carrying an annular water distributing or spray nozzle 15 which may be arranged in communication by means of a feed tube 16 such as a hose or the equivalent thereof with a water supply faucet 17. The spray nozzle 15, it will be observed, is formed as a part of the cover and of annular shape being of a diameter nearly equal to the diameter of the cover, so that the spray will be projected rather from the vicinity of the walls of the receptacle than from the center.

After stacking the dishes in an upright or edgewise position as indicated in the drawing in the receptacle the cover may be fitted in place and water from a suitable source such as a hot water spigot or faucet may be supplied to the distributing nozzle of which the perforations are sufficiently small to cause the water to strike the dishes from various angles and under a pressure sufficient to remove accumulations of foreign matter thereon. If necessary the outlet from the receptacle may be kept closed for a time in order to permit of the soaking of the dishes, any suitable cleansing or detergent substance such as soap being employed if necessary, and when the accumulations on the dishes have become loosened the stopper may be removed to permit of the outflow of the water which has been used in the soaking operation while the supply of water may be resumed to rinse the dishes and if hot water is employed in the rinsing operation it is obvious that when the flow has been discontinued, whether the lid or cover is left in place or not, the dishes will drain and due to the heat thereof will dry before removal from the receptacle.

Having described the invention, what is claimed as new and useful is:—

A dish washing apparatus consisting of a receptacle provided near its bottom with an outlet, a lid removably fitted upon the receptacle and formed on its under face with an annular distributing nozzle of a diameter slightly less than the diameter of the cover, the said nozzle being formed with perforations on its under face for the discharge of a cleansing agent in the direction of the bottom of the receptacle and from the vicinity of the walls thereof, and a flexible tubular member connected with said nozzle and adapted for connection with a spigot in the manner and for the purpose specified.

In testimony whereof she affixes her signature.

FLORENCE H. DUNN.